United States Patent
Usuki et al.

(10) Patent No.: US 6,455,646 B1
(45) Date of Patent: Sep. 24, 2002

(54) POLYMERIZATION OF VINYL CHLORIDE WITH HYDROXYCARBOXYLIC ACIDS, INHIBITORS AND FE IONS

(75) Inventors: Masahiro Usuki; Minoru Shigemitsu; Tadashi Amano, all of Kamisu-machi (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/988,524

(22) Filed: Nov. 20, 2001

(30) Foreign Application Priority Data

Nov. 21, 2000 (JP) .......................... 2000-354867

(51) Int. Cl.$^7$ .............................. C08F 2/16; C08F 14/06
(52) U.S. Cl. ....................................... 526/93
(58) Field of Search ........................... 526/93, 202, 210, 526/211

(56) References Cited

U.S. PATENT DOCUMENTS 3,382,223 A    5/1968  Borsini et al.
4,619,978 A  * 10/1986  Reid ........................... 526/213
5,290,890 A    3/1994  Jongshun et al.
6,022,932 A    2/2000  Ooura et al. .................. 526/62

* cited by examiner

Primary Examiner—Christopher Henderson
(74) Attorney, Agent, or Firm—Oblon, Spivak, McClelland, Maier & Neustadt, P.C.

(57) ABSTRACT

Vinyl chloride or a monomer mixture containing it transported over a long distance or stored for a long period usually contains a polymerization inhibitor and Fe ions. If this kind of vinyl chloride or monomer mixture is polymerized, stirring torque during the polymerization increases, and heat removal by the cooling jacket of a polymerization vessel tends to become insufficient, making the polymer quality subject to bad influences. In the present invention, a hydroxycarboxylic acid compound is added to the polymerization mixture in an amount of 50–1000 ppm relative to the monomer or monomer mixture. As a result, an increase in stirring torque during polymerization is suppressed, and heat removal by the cooling jacket of the polymerization vessel can be performed effectively, making it possible to obtain vinyl chloride of good quality.

8 Claims, No Drawings

POLYMERIZATION OF VINYL CHLORIDE WITH HYDROXYCARBOXYLIC ACIDS, INHIBITORS AND FE IONS

BACKGROUND OF THE INVENTION

1. Field of the Invention

The present invention relates to a process for producing a vinyl chloride polymer, and relates in particular to a process for producing a vinyl chloride polymer that can control lowering of the heat removal capability of the cooling jacket of a polymerization vessel and lowering of polymer quality caused by an increase of stirring torque in producing a polymer when monomers supplied for polymerization contain a polymerization inhibitor and Fe ions.

2. Description of the Prior Art

In producing a vinyl chloride polymer by polymerizing vinyl chloride or a mixture of vinyl chloride and monomers polymerizable with it in an aqueous medium, the vinyl chloride polymer is usually produced by charging in a polymerization vessel vinyl chloride or a monomer mixture containing vinyl chloride, charging water, a dispersing agent, and a polymerization initiator, and polymerizing vinyl chloride or the monomer mixture for a given time at a given polymerization temperature. If the vinyl chloride or monomer mixture used is transported over a long distance or stored for a long period, as a result of an apparent slurry viscosity increase and stirring torque increase during polymerization, the heat removal capability for reaction heat by the cooling jacket of a polymerization vessel decreases, and controlling the polymerization temperature becomes difficult. Moreover the bulk specific gravity and plasticizer take-up of the obtained polymer decrease, with the problem that the particle size becomes finer. As a countermeasure for this problem, there are methods such as a method in which the amount of the charged water relative to the charged monomer amount is increased, a method wherein the kind of dispersing agent and the amount of adding it are adjusted, and a method in which water is added during polymerization, but were not able to solve these problems sufficiently.

SUMMARY OF THE INVENTION

An objective of the present invention is to provide a process for producing a vinyl chloride polymer that can make it easy to remove the reaction heat by a polymerization vessel jacket by stabilizing the stirring torque during polymerization, even if vinyl chloride or a monomer mixture containing it which were transported over a long distance or stored for a long period is polymerized to produce a vinyl chloride polymer without a negative influence on the quality of the polymer.

When vinyl chloride or a monomer mixture containing it is put in a storage tank and transported over a long distance or stored for a long period, a polymerization inhibitor is usually added in the monomers in order to suppress polymerization in the tank. The present inventors, as the result of their zealous investigation, have found out that the cause why this problem occurs when vinyl chloride or a monomer mixture containing it are transported over a long distance or stored for a long period is polymerized is not only the polymerization inhibitor contained in the monomers but that divalent or trivalent Fe ions mix into the monomers from the interior wall of the storage tank due to corrosion etc. during long-term transportation or long-term storing. Furthermore, they have found that this problem can be solved by adding an hydroxycarboxylic acid compound to the polymerization mixture in a specified amount, leading to the present invention.

Thus, the present invention provides as a means for solving the problem a process for producing a vinyl chloride polymer, comprising the steps of:

(A) charging raw materials comprising vinyl chloride or a mixture of vinyl chloride and a monomer or monomers copolymerizable with vinyl chloride and water into a polymerization vessel, said vinyl chloride or the monomer mixture containing at least 0.1 ppm of a polymerization inhibitor and at least 0.01 ppm of Fe ions, (B) polymerizing the vinyl chloride or the monomer mixture thus charged in an aqueous medium, and (C) adding a hydroxycarboxylic acid compound in an amount of 50 to 1000 ppm relative to the monomer or monomer mixture to the mixture containing the monomer or monomer mixture in the polymerization vessel, at at least one step of the steps (A) and (B) above.

DESCRIPTION OF THE PREFERRED EMBODIMENTS

The process of the present invention is explained hereafter in greater detail. Herein, ppm is the weight measure in the explanation unless specified otherwise.

[Hydroxycarboxylic Acid Compounds]

The hydroxycarboxylic acid compound used in the present invention preferably forms a complex with Fe ions. Fe ions may exist as divalent ones or trivalent ones, or in combination thereof. These Fe ions may exist in a free state or form salts.

The hydroxycarboxylic acid compound is a compound which has a hydroxyl group and a carboxyl group in a molecule, e.g., aliphatic hydroxycarboxylic acids such as glycolic acid, gluconic acid, lactic acid, hydroxyacrylic acid, α-hydroxybutyric acid, glyceric acid, tartronic acid, malic acid, tartaric acid, and citric acid; aromatic hydroxycarboxylic acids such as salicylic acid, m-hydroxybenzoic acid, p-hydroxybenzoic acid, gallic acid, mandelic acid, tropic acid, and alkali metal salts and ammonium salts thereof, among which alkali metal salts and ammonium salts are preferred. Hydroxycarboxylic acid compounds which may be used in the present invention are not limited to these, but any oxycarboxylic acids having an asymmetric carbon atom with the D, L or DL configuration can be used. Also, alkali metal salts and ammonium salts may be in any form of normal salt, acid salt (hydrogen salt), simple salt, and double salt, and a part or the whole may be in a state of salt. These hydroxycarboxylic acid compounds are used as a single kind alone or two kinds or more combined. Among the hydroxycarboxylic acid compounds, especially preferred are alkali metal salts and ammonium salts of malic acid, tartaric acid, and citric acid, and further preferred are ammonium salts thereof.

The amount of the hydroxycarboxylic acid compound to be added in the present invention is 50–1000 ppm relative to the vinyl chloride or monomer mixture containing it, and preferably 100–400 ppm. The timing to add this is not specified, and it is added to or with the mixture of the raw materials at the step (A) and/or to the reaction mixture at the step (B) stated above. Usually it is good to add it to water or vinyl chloride or a monomer mixture containing it when charging the raw materials. There are no restrictions in terms of the adding method etc., either, and it may be in various forms such as solution, aqueous dispersion, and powder, and it is preferable to add it as a solution or aqueous dispersion for ease of handling. If the added amount is too small, the addition effect is not enough, and if the added amount is too large, antistatic properties of the resulting polymer resin is lowered and cost increases, which is not preferable.

[Other Raw Materials]

Monomers and other materials and additives used for polymerization in the present invention may be those usually used for polymerization of vinyl chloride and monomer mixtures containing it in an aqueous medium. Below, they are individually explained.

Monomers

The monomer used as raw material in the present invention is vinyl chloride or a monomer mixture containing vinyl chloride as its main ingredient. The monomer mixture containing vinyl chloride as its main ingredient is a mixture consisting of at least 50 wt. % of vinyl chloride and other monomers copolymerizable with vinyl chloride. The other monomers copolymerizable with vinyl chloride which may be used, for example, include vinyl esters such as vinyl acetate and vinyl propionate; acrylic esters and methacrylic esters such as methyl acrylate and ethyl acrylate; olefins such as ethylene and propylene; maleic anhydride; acrylonitrile; styrene; vinylidene chloride, etc. These can be used as a single kind alone or two kinds or more combined.

Polymerization Inhibitors

When the monomers are transported over a long distance or stored for a long period, dissolution of divalent or trivalent Fe ions occurs in the monomers due to the corrosion of the tank material inner wall etc. containing Fe as its composition. Also, a polymerization inhibitor is added as a stabilizer to the monomers for the purpose of long-distance transportation or long-term storing. As this polymerization inhibitor, for example, included are phenols such as hydroquione, p-methoxyphenol, and t-butylcatechol, and other polymerization inhibitors having a structure of phenol or hydroquinone in the molecules. The present invention can be preferably implemented in the case where the polymerization inhibitor is contained in the monomers in an amount of 0.1 ppm or more, especially 0.1 ppm–50 ppm, and Fe ions are contained in an amount of 0.01 ppm or more, especially 0.01 ppm–20 ppm.

Also, the process of the present invention is preferably implemented in the case where hydroquinone is added as a polymerization inhibitor, especially where the total content of a polymerization inhibitor and Fe ions is 3–30 ppm.

Other than the polymerization inhibitor added for long-distance transportation or long-term storing, the following antioxidants can be added to the monomer or monomer mixture. There is no special restriction on such antioxidants, and they may be those conventionally used in producing a vinyl chloride polymer. Examples include phenol compounds such as 2,2-di(4'-hydroxyphenyl)propane, hydroquinone, p-methoxy phenol, t-butylhydroxyanisol, n-octadecyl-3-(4-hydroxy-3,5-di-t-butylphenyl)propionate, t-butylhydroquinone, 2,5-di-t-butylhydroquinone, 4,4'-butylidene bis(3-methyl-6-t-butylphenol), 3,5-di-t-butyl-4-hydroxytoluene, 2,2'-methylene-bis(4-ethyl-6-t-butylphenol), triethylene glycol bis[3-(3-t-butyl-5-methyl-4-hydroxyphenyl)propionate], pentaerythrityl-tetrakis[3-(3,5-di-t-butyl-4-hydroxyphenyl)propionate], 2,6-di-t-butyl-4-sec-butylphenol, 2,6-di-t-butyl-4-methylphenol, t-butylcatechol, 4,4'-thiobis(6-t-butyl-m-cresol), trophenol, nordihydroguaiaretic acid; semicarbazide derivatives such as semicarbazide, 1-acetyl semicarbazide, 1-chloroacetylsemicarbazide, 1-dichloroacetylsemicarbazide, 1-benzoylsemicarbazide, and semicarbazone; thiocarbazide derivatives such as carbohydrazide, thiosemicarbazide, and thiosemicarbazone; amine compounds such as phenylnaphthylamine, N,N'-diphenyl-p-phenylene diamine, and 4,4'-bis (dimethylbenzyl)diphenylamine; nitro or nitroso compounds such as nitroanisol, N-nitrosodiphenylamine, nitroaniline, and N-nitrosophenylhydroxyamine aluminum salt; phosphorus compounds such as triphenylphosphite, diphenylisodecylphosphite, phenyldiisodecylphosphite, 4,4'-butylidene-bis(3-methyl-6-t-butylphenyl-di-tridecyl) phosphite, cyclic pentane tetraylbis octadecyl phosphate), tris(nonylphenyl)phosphite, and tris(dinonylphenyl) phosphite; unsaturated hydrocarbon compounds such as styrene, 1,3-hexadiene, and methylstyrene; sulfur compounds such as dilauryl thiodipropionate, dimyristyl thiodipropionate, distearyl thiodipropionate, dodecylmercaptane, and 1,3-diphenyl-2-thiourea. Among these compounds, 3,5-di-t-butyl-4-hydroxytoluene, triethylene glycol-bis-[3-(3-t-butyl-5-methyl-4-hydroxyphenyl) propionate], t-butyl hydroxyanisol, t-butylhydroquinone, 2,6-di-t-butyl-4-sec-butylphenol, and octadecyl-3-(3,5-di-t-butyl-4-hydroxy phenyl) propionate are preferred, because initial discoloration is small when the obtained polymer is formed in a sheet and because scale adhesion to the polymerization vessel is small. In this instance, the initial discoloration indicates discoloration that appears when a vinyl chloride polymer is formed in a sheet for example.

The antioxidant may be used as a single kind alone or as two kinds or more combined, and is added in an amount of 0.006–0.01 part by weight per 100 parts by weight of charged monomers. Also, the antioxidant may be added at any time between the stage of charging the raw materials and the final stage of polymerization.

Dispersing Agents

As a dispersing agent used in polymerizing vinyl chloride or a monomer mixture containing vinyl chloride, included for example are water-soluble cellulose ethers such as methylcellulose, hydroxyethylcellulose, hydroxypropylcellulose, and hydroxypropylmethylcellulose; water-soluble partially saponified polyvinyl alcohols; acrylic acid polymers; water-soluble polymers such as gelatin; oil-soluble emulsifiers such as sorbitane monolaurate, sorbitane triolate, glycerol tristearate, and ethylene oxide-propylene oxide block copolymer; water-soluble emulsifiers such as polyoxyethylene sorbitane monolaurate, polyoxyethylene glycerol olate, and sodium laurate. These are used as a single kind alone or two kinds or more combined, and 0.02–1 part by weight is added per 100 parts by weight of charged monomers.

Polymerization Initiators

As to the polymerization initiator which may be used in the present invention, there is no restriction thereon, and those used in producing conventional vinyl chloride polymers may be used. For example, included are peroxycarbonate compounds such as diisopropyl peroxydicarbonate, di-2-ethylhexyl peroxydicarbonate, and diethoxyethyl peroxydiarbonate; peroxyester compounds such as t-butyl peroxypivalate, t-hexyl peroxypivalate, t-butyl peroxyneodecanate, and α-cumyl peroxyneodecanate; peroxides such as acetyl cyclohexyl sulfonyl peroxide, 2,4,4-trimethylpentyl-2-peroxy phenoxy acetate, and 3,5,5-trimethylhexanoyl peroxide; azo compounds such as azobis-2,4-dimethylvaleronitrile, azobis(4-methoxy-2,4-dimethylvaleronitrile); potassium persulfate, ammonium persulfate, and hydrogen peroxide. These are used as a single kind alone or two kinds or more combined, and 0.01–0.2 part by weight is added to 100 parts by weight of charged monomers.

In the process of the present invention, other than the above, a polymerization degree regulator, a chain transfer agent, a gelation improver, an antistatic additive, etc. commonly used for producing vinyl chloride polymers can be used upon necessity. Also, antioxidants can be added before, during, or after polymerization for the purposes of controlling polymerization reaction, preventing degradation of the produced polymer, etc.

Other Polymerization Conditions

Other conditions in polymerization such as the method of charging in a polymerization vessel and ratio of charging of an aqueous medium, vinyl chloride or a monomer mixture containing vinyl chloride, dispersing agents, and a polymerization initiator, the polymerization temperature, etc. may be the same as conventional by used.

EXAMPLES

Although the present invention is described below in detail with examples, the present invention is not limited to these.

Example 1

In a stainless steel polymerization vessel with a capacity of 2 m$^3$, charged were 980 kg of deionized water, 700 kg of 10 wt. % aqueous solution of ammonium tartrate (70 g as ammonium tartrate), 382 g of partially saponified polyvinyl alcohol with a saponificaiton degree of 80.5 mol %, and 143 g of hydroxypropylmethyl cellulose with a methoxy substitution degree of 28.5 wt. % and hydroxypropoxy substitution degree of 8.9%. Subsequently, after degassing the interior of the polymerization vessel until the internal pressure became 60 mmHg, 700 kg of vinyl chloride monomer (containing 6 ppm of hydroquinone and 1 ppm of Fe) was charged. 350 g of di-2-ethylhexylperoxy dicarbonate was charged as a polymerization initiator with stirring, and at the same time warm water was passed through the jacket provided for the polymerization vessel to start raising the temperature inside the polymerization vessel, and when the temperature rose to 57.0° C., that temperature was maintained and polymerization was continued.

At the point when the pressure inside the polymerization vessel dropped to 0.588 MPa (polymerization rate: 86%), 700 g of 30% aqueous dispersion of triethylene glycol bis-[3-(3-t-butyl-5-methyl-4-hydroxyphenyl) propionate] was added, and unreacted monomers was recovered. To the obtained polymer slurry, 280 g of 25% ammonia water was added to control the pH, and then the polymer slurry was dehydrated to obtain a vinyl chloride polymer.

The 100 mesh passing %, bulk specific gravity, and the plasticizer take-up of the obtained polymer, and the maximum stirring torque number and the minimum jacket temperature during polymerization are listed in Tables 1 and 2.

Here, quantitative analysis of hydroquinone and Fe ions in the monomers, and the ratio of particles exceeding 100 mesh, bulk specific gravity, and plasticizer take-up of the obtained polymer are measured as follows.

Quantitative Analyses of Hydroquinone and Fe Ions in Vinyl Chloride Monomers

Quantitative analyses of hydroquinone and Fe ions in vinyl chloride were performed by vaporizing the monomer into gas to leave a residue. For analysis of hydroquinone, an extract from the residue with acetonitrile was quantitatively analyzed by liquid chromatography. For analysis of Fe ions, an extract from the residue with 1N hydrochloric acid was quantitatively analyzed by ICP emission spectrometry.

Particle Size (%) Under 100 Mesh

According to the particle size distribution measurement of JIS Z-8801, a specimen is measured for the weight % of articles that passed a 100 mesh sieve.

Bulk Specific Gravity

Measured according to the JIS K-6273.

Plasticizer Take-up

Glass fiber is packed in the bottom of an aluminum alloy container with an inner diameter of 25 mm and a depth of 85 mm, 10 g of a specimen is charged in the container, 15 ml of dioctyl phthalate (DOP) is further added, and it is left for 30 minutes to permit the DOP infiltrate the specimen sufficiently, then the excess DOP is removed by centrifugation under an acceleration of 1500 G. The weight of the removed DOP is measured, and the amount of DOP absorbed to the specimen is calculated as weight % relative to the weight of the specimen before absorption.

Examples 2–4 and Comparative Examples 1–3

These examples were performed in the same manner as in Example 1 except that the initial additives in the amounts given in Table 1 were used in place of ammonium tartrate used in Example 1 or nothing was used at all.

Referential Examples 1–4

These examples were performed in the same manner as in Example 1, except that the vinyl chloride monomers under the conditions given in Table 2 were charged in place of vinyl chloride monomers used in Example 1 and the initial additives in the amounts given in Table 2 or nothing was used at all.

TABLE 1

|  | EX. 1 | EX. 2 | EX. 3 | EX. 4 |
|---|---|---|---|---|
| Hydroquinone in VC (ppm) | 6 | 6 | 6 | 6 |
| Fe ions in VC (ppm) | 1 | 1 | 1 | 1 |
| Initial additive | Ammonium tartrate | Trisodium citrate | Triammonium citrate | Citric acid |
| Amount relative to VC (ppm) | 100 | 200 | 200 | 200 |
| Max. torque number during polymerization (N · m) | 116 | 120 | 115 | 125 |
| Min. jacket temp. during polymerization (° C.) | 39 | 40 | 38 | 36 |
| Particle size (%) (under 100 mesh) | 59 | 62 | 57 | 68 |
| Bulk specific gravity (g/ml) | 0.540 | 0.539 | 0.542 | 0.535 |
| Plasticizer take-up (%) | 22.4 | 22.1 | 22.5 | 21.8 |

|  | Comp. EX. 1 | Comp. EX. 2 | Comp. EX. 3 |
|---|---|---|---|
| Hydroquinone in VC (ppm) | 6 | 6 | 6 |
| Fe ions in VC (ppm) | 1 | 1 | 1 |
| Initial additive | EDTA | Pyrophosphoric acid | — |
| Amount relative to VC (ppm) | 100 | 100 | 0 |
| Max. torque number during polymerization (N · m) | 137 | 144 | 165 |
| Min. jacket temp. during polymerization (° C.) | 32 | 32 | 29 |
| Particle size (%) | 73 | 75 | 86 |

TABLE 1-continued

| | | | |
|---|---|---|---|
| (under 100 mesh) | | | |
| Bulk specific gravity (g/ml) | 0.533 | 0.531 | 0.525 |
| Plasticizer take-up (%) | 20.5 | 20.3 | 19.5 |

TABLE 2

| | Ref. EX. 1 | Ref. EX. 2 | Ref. EX. 3 | Ref. EX. 4 |
|---|---|---|---|---|
| Amount of hydroquinone in VC (ppm) | 0 | 0 | 2 | 0 |
| Amount of Fe ions in VC (ppm) | 0 | 0 | 0 | 0.02 |
| Initial additive | — | Triammonium citrate | — | — |
| Amount relative to VC (ppm) | 0 | 200 | 0 | 0 |
| Max. torque number during polymerization (N·m) | 115 | 117 | 118 | 116 |
| Min. jacket temp. during polymerization (°C.) | 38 | 38 | 37 | 38 |
| Particle size (100 mesh passing %) | 58 | 60 | 62 | 60 |
| Bulk specific gravity (g/ml) | 0.542 | 0.543 | 0.540 | 0.540 |
| Plasticizer take-up (%) | 22.5 | 22.2 | 22.2 | 22.4 |

Remarks: VC is an abbreviation of vinyl chloride.

The vinyl chloride used in the above Referential Examples does not contain any polymerization inhibitor or Fe ions. As is clear from comparison between the results of Examples and the those of Comparative Examples, even if a polymerization inhibitor or Fe ions are contained in vinyl chloride or monomers containing it, polymerization can be performed in the same manner as in the polymerization of vinyl chloride or monomer mixture containing neither polymerization inhibitor nor Fe ions. That is, heat removal by cooling with the jacket does not become difficult due to an increase in the stirring torque number during polymerization, and the quality of polymeric products is stable.

What is claimed is:

1. A process for producing a vinyl chloride polymer, comprising the steps of:

(A) charging raw materials comprising vinyl chloride or a mixture of vinyl chloride and a monomer or monomers copolymerizable with vinyl chloride and water into a polymerization vessel, said vinyl chloride or the monomer mixture containing at least 0.1 ppm of a polymerization inhibitor and at least 0.01 ppm of Fe ions, (B) polymerizing the vinyl chloride or the monomer mixture thus charged in an aqueous medium, and (C) adding a hydroxycarboxylic acid compound in an amount of 50 to 1000 ppm relative to the amount of the monomer or monomer mixture to the mixture containing the monomer or monomer mixture in the polymerization vessel, at at least one step of the steps (A) and (B) above.

2. The process according to claim 1, wherein the hydroxycarboxylic acid compound is selected from the group consisting of aliphatic hydroxycarboxylic acids, aromatic hydroxycarboxylic acids, alkali salts thereof, and ammonium salts thereof.

3. The process according to claim 1, wherein the hydroxycarboxylic acid compound is selected from the group consisting of glycolic acid, gluconic acid, lactic acid, hydroxyacrylic acid, α-hydroxybutyric acid, glyceric acid, tartronic acid, malic acid, tartaric acid, citric acid, salicylic acid, m-hydroxybenzoic acid, p-hydroxybenzoic acid, gallic acid, mandelic acid, tropic acid, alkali metal salts thereof, and ammonium salts thereof.

4. The process according to claim 1, wherein the hydroxycarboxylic acid compound is an ammonium hydroxycarboxylate.

5. The process according to claim 1, wherein the amount of the hydroxycarboxylic acid compound to be added is in the range of 100–400 ppm relative to the amount of the vinyl chloride or the monomer mixture containing it.

6. The process according to claim 1, wherein the polymerization inhibitor is hydroquinone.

7. The process according to claim 1, wherein the polymerization inhibitor is contained in the monomer or monomer mixture in an amount of 0.1 ppm to 50 ppm, and Fe ions are contained in an amount of 0.01 ppm to 20 ppm.

8. The process according to claim 1, wherein the total amount of the polymerization inhibitor and the Fe ions contained in the monomer or monomer mixture is in a range of 3–30 ppm.

* * * * *